Feb. 21, 1967  C. B. OGLE, JR  3,305,024
PLOW TAIL WHEEL
Filed March 23, 1964  5 Sheets-Sheet 1

Claude B. Ogle, Jr.
INVENTOR.
WHANN & McMANIGAL
Attorneys for Applicant

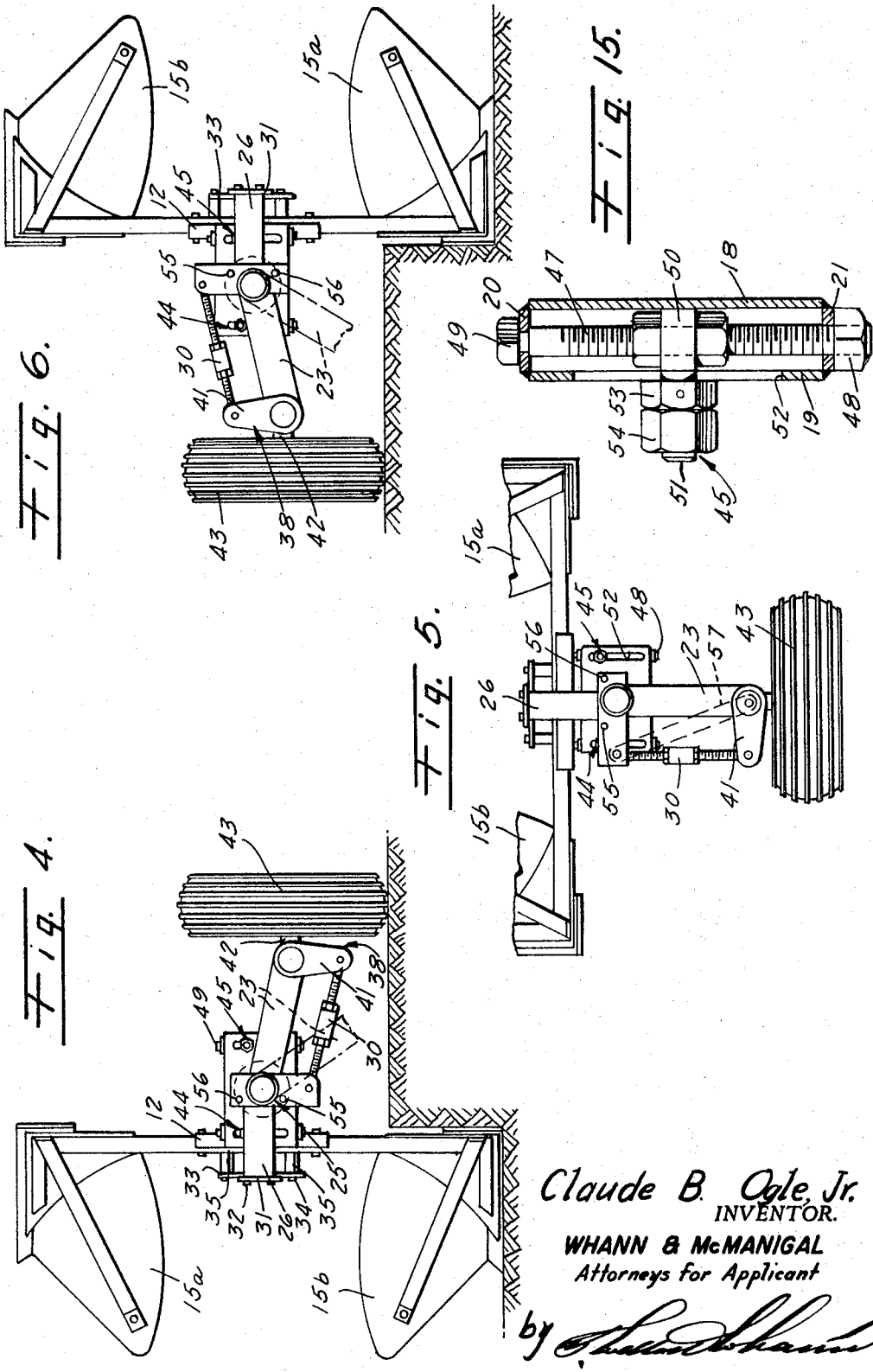

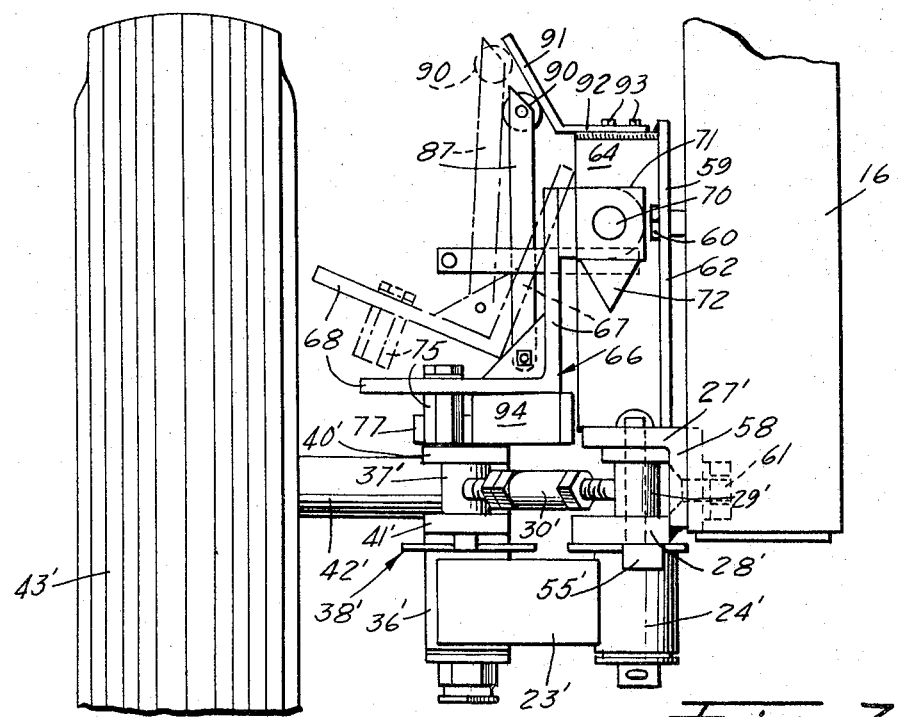
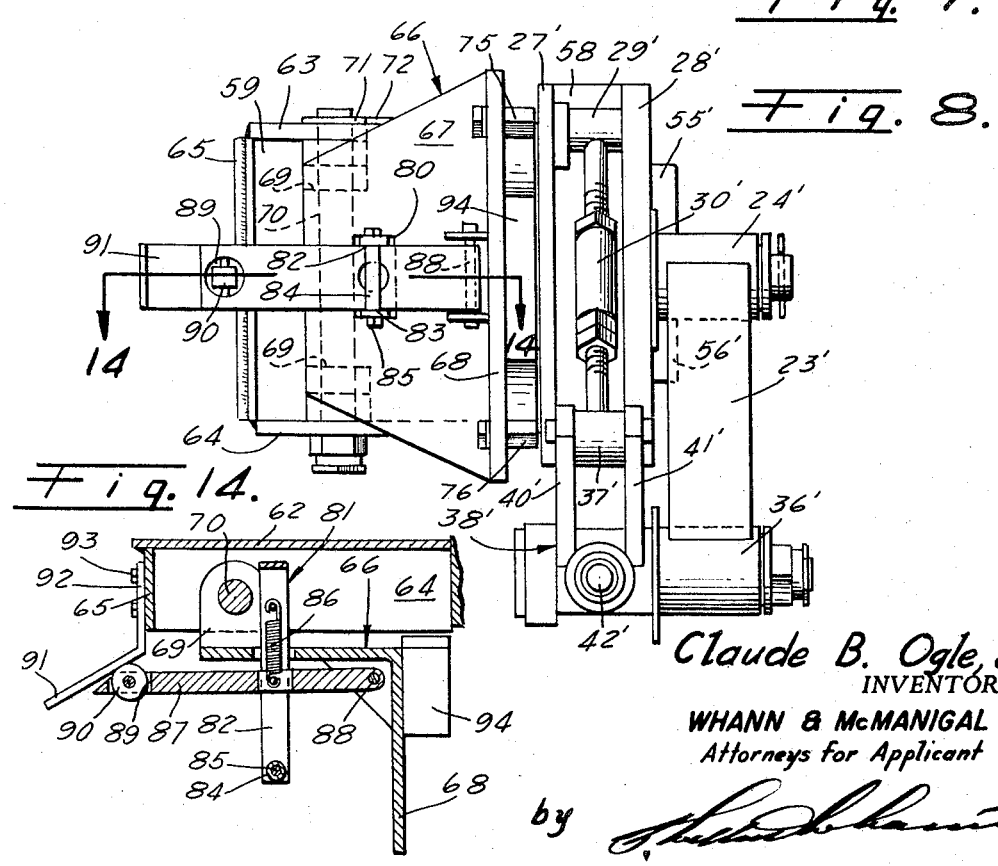

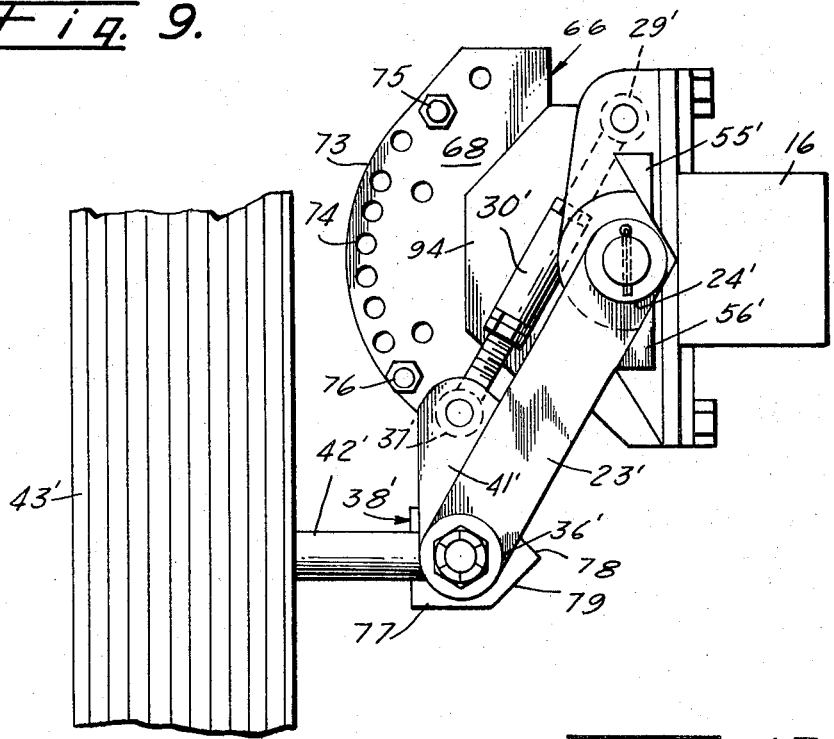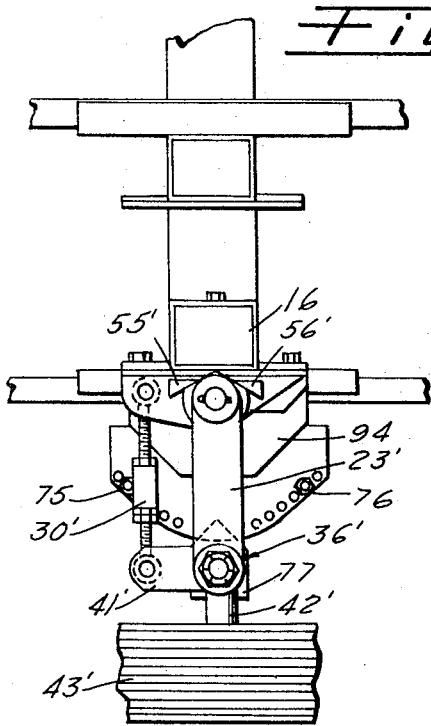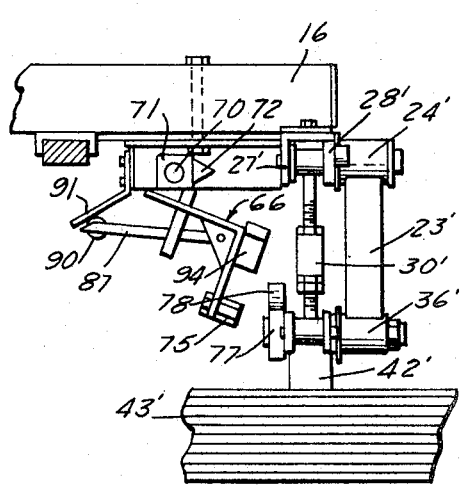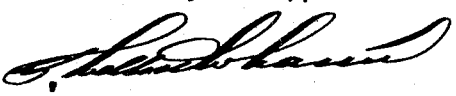

Claude B. Ogle, Jr.
INVENTOR.
WHANN & McMANIGAL
Attorneys for Applicant

United States Patent Office 3,305,024
Patented Feb. 21, 1967

3,305,024
PLOW TAIL WHEEL
Claude B. Ogle, Jr., 2495 E. Orange Grove Ave.,
Pasadena, Calif. 91104
Filed Mar. 23, 1964, Ser. No. 354,009
9 Claims. (Cl. 172—212)

The present invention relates generally to earth working equipment; and is more particularly concerned with a novel land gauge wheel for plows, and especially plows of the reversible or two-way type.

Gauge wheels for determining plowing depth as conventionally employed with two-way or rollover type plows are in general carried by a pivoted arm arranged to shift its position from one side to the other as the rollover frame is changed to reverse the plows. During rollover, the gauge wheel and its pivoted arm support in present arrangement are more or less free to move under gravitational forces from a stop engaging operating position on one side to a stop engaging position on the other side. These movements in the usual arrangements are terminated with an impact which creates a serious problem in that the associated parts are very often subjected to damaging impact forces.

In the present invention, it is proposed to support and control the gauging wheel assembly in such manner that the transition from one operating position to the other will be accomplished in a positively controlled smooth manner, so as to eliminate the undesirable impact forces.

A further object is to provide depth gauge means, wherein the gauge wheel and its support will be moved initially by gravitational forces away from an associated depth determining stop, when the plows are raised out of the ground, and wherein its movement during rollover will be positively controlled in response to the rollover operation.

A still further object is to provide depth gauging means in which a gauge wheel and its support have a path of movement below the rollover axis of rotation, and wherein at the rollover mid-position the gauge wheel will have its plane or rotation disposed horizontally, thus minimizing the amount of ground clearance required to change from one plowing position to the other.

Another object is to provide depth gauge means of the character described, wherein a gauge wheel at its mid-rollover position will be supported below the rollover axis of rotation in such a manner as to enable a limited freedom of swinging movement thereof in the event of accidentally striking an object while in this position and doing forward movement of the plow.

It is also an object of the herein described invention to provide improved means for gauging and controlling the plowing depth, which includes a gauge wheel arranged to run on plowed ground adjacent the last furrow, and wherein the wheel support is so arranged that the wheel will be moved further over onto unplowed ground so as to provide greater ground support and overcome a tendency of the ground to break away as the plowing depth is increased and the lateral support at the furrow decreased.

Yet another object of the invention is to provide a novel support mechanism for gauge wheels in reversible or two-way plows, which utilizes a parallel linkage mechanism, whereby the gauge wheel axis will be controlled during change-over from one plowing position to the other.

Further objects of the invention will be brought out in the following part of the specification, wherein detailed description is for the purpose of fully disclosing the invention without placing limitations thereon.

Referring to the accompanying drawings, which are for illustrative purposes only:

FIGS. 4, 5 and 6 are views schematically showing the operation of the tail wheel mechanism during change of position of the plow bottoms from one side to the other;

FIG. 7 is a plan view of a modified embodiment of the invention showing the position of the parts on the left side of the frame, the frame being in lifted position;

FIG. 8 is a side elevational view of the same;

FIG. 9 is a fragmentary rear view of the embodiment shown in FIG. 7;

FIGS. 10, 11 and 12 are views schematically illustrating the operation of this embodiment of the invention tail wheel shifting mechanism during change of plow bottoms from one side to the opposite side;

FIG. 13 is a fragmentary side elevational view showing the position of certain parts of the tail wheel structure, when the tail wheel is in the position shown in FIG. 11;

FIG. 14 is a fragmentary sectional view illustrating the cooperative relationship of certain of the parts, taken substantially on line 14—14 of FIG. 8; and FIG. 15 is an enlarged detail section, taken substantially on line 15—15 of FIG. 3, showing means for adjusting the plowing depth stop.

Figure 1:
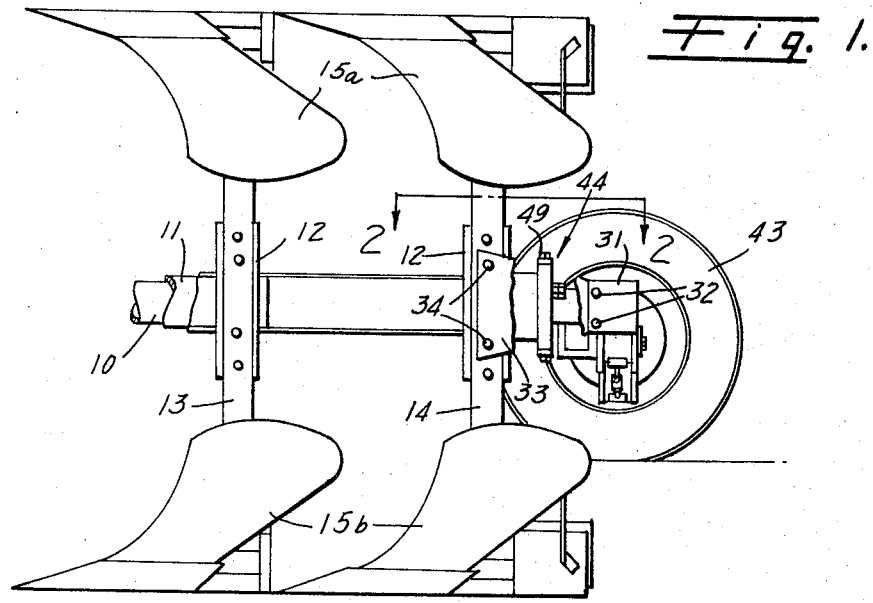
FIG. 1 is an elevational side view of a two-way plow embodying a tail wheel construction according to one form of the present invention.

Referring more specifically to the drawings, for illustrative purposes, the present invention is disclosed as being applied to a two-way plow construction that incorporates a supporting beam 10 which is associated with a draft mechanism (not shown) which also provides for tiltably raising the beam member so as to move the plow bottoms into the air and permit transportation of the plow from one point to another. The draft mechanism also usually incorporates suitable means for actuating a rollover frame structure which in this instance is indicated as comprising a tubular member 11 in concentric relation to and rotatable on the beam 10. The tubular member usually is fabricated into the rollover frame structure and provides supporting brackets 12 or an equivalent structure for supporting conventional standards such as indicated by the numerals 13 and 14, respectively. These standards are arranged so as to project above the horizontal plane passing through the rollover frame and the tubular member 11, and are adapted to carry at their ends sets of oppositely disposed plow bottoms 15a and 15b which may be brought selectively into positions of use by rotating the rollover frame about the beam 10 so as to position the plow bottoms on one side or the other for reversed plowing operations.

As thus far described, the two-way plow construction may vary somewhat as to details, and in this respect may have an effect upon the particular arrangement of parts for carrying out the features of the present invention. For example, in one type of construction, as shown in FIG. 1, the rear end of the beam 10 may be positioned rearwardly of the last set of plows and provided with a fixed collar 15 against which the adjacent end of the tubular member 11 abuts. In this construction, the after end of the beam 10 is available to provide a fixed support which may be utilized in connection with the tail wheel supporting and controlling mechanism, as will hereinafter be described. However, in some constructions the associated beam 10 and tubular member 11 are relatively shorter and terminate forwardly of the last plowing elements, so that in an arrangement of this type a fixed support is not available. As a consequence, the invention is embodied in a modified structure as shown in FIG. 7, in which the tail wheel control and actuating mechanism is carried by a part of the rollover frame structure 16 which is radially offset from the axis of rotation of the rollover frame.

Figures 2, 3:
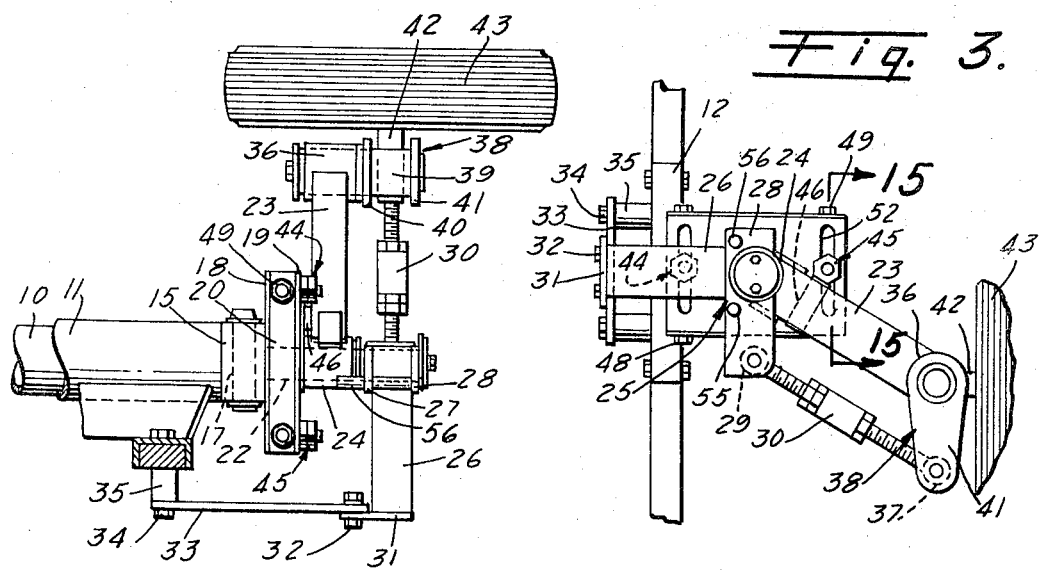
FIG. 2 is an enlarged fragmentary sectional view of the same, taken substantially on line 2—2 of FIG. 1.
FIG. 3 is a fragmentary rear end view showing details of the tail wheel controlling and shifting means, and with the tail wheel shown in a plowing depth regulating position.

Referring more specifically to the drawings, the embodiment shown in FIG. 1 will now be described. In this embodiment, the collar 15, as shown in FIG. 2, is fixedly secured to the end of beam 10 by means of a securing pin 17. This collar forms a part of a unit assembly containing a rectangular box-like structure fabricated with a front plate 18, a spaced back plate 19, top plate 20 and bottom plate 21 (FIG. 15). The front plate is secured to the collar 15, and an axially aligned stub axle 22 is supported in the assembly and projects rearwardly of the back plate 19 to form a pivotal support for the tail wheel control and operating mechanism as will hereinafter be described.

An arm 23 has an end 24 which is pivoted on the stub axle adjacent the back plate 19 for swinging movement, and at the outer end of the stub axle there is pivoted a bell crank, as generally indicated at 25 as having right angularly extending leg portions, one leg portion being formed an an arm 26, and the other leg portion being formed by a pair of spaced elongate plates 27 and 28 which are welded or otherwise permanently affixed to the opposite sides of the inner end of the arm 26 at the point of rotational support of the bell crank on the stub shaft. The outermost ends of the plates 27 and 28 are pivotally connected to an end 29 of an adjustable turnbuckle link 30. In order that the bell crank 25 will move with and follow the rotational movements of the rollover frame, the outermost end of the arm 26 is fitted with an end plate 31 which is secured by bolts 32 to one end of a support plate 33, the other end of which is anchored as by bolts 34 to the rollover frame, spacers 35 being interposed between the support plate and the adjacent part of the rollover frame.

The arm 23 has an outer end 36 and the turnbuckle link 30 an outer end 37 which are pivotally connected with a bell crank as generally indicated by the numeral 38. The bell crank is constructed with an axle member 39 which is welded or otherwise permanently connected with right angle arm portions of the bell crank. One arm of the bell crank is formed by spaced radial lugs 40 and 41, the outer ends of which are pivotally connected with the outer end 37 of the turnbuckle linke 30. The other arm of the turnbuckle is formed by a right angle shaft 42 which has its innermost end secured to the axle 39 so as to project laterally therefrom to provide a trunnion support for the gauge wheel 43. As clearly shown in FIG. 2, the axle 39 projects beyond the lug 40 and has pivotal bearing relation with the outer end 36 of the arm 23.

From the above description, it will be seen that the arm 23 and the turnbuckle link 30 in coopeartion with the end connected arms of the bell cranks 25 and 38 provide a parallel motion linkage or a pantograph assembly which will permit raising and lowering adjustable movements of the gauge wheel 43 for different plowing depths, and that in the respective depth adjustments, the shaft 42 will be maintained in a substantially horizontal position. The adjustments of the gauge wheel for various plowing depths will be accomplished by swinging movement of the arm 23 in a plane at right angles to the axis of rotation of the rollover frame structure.

The plowing depth is controlled by means of adjustable stops 44 and 45 which are arranged on the outer surface of the back plate 19 and respectively positioned on opposite sides of the axis of rotation of the rollover frame. The stops are engageable by a bumper plate 46 which is carried by the arm 23 and serve to regulate the downward movement of the rollover frame and connected plow bottoms in the respective operating plowing positions.

As best shown in FIG. 15, each of the stops 44 and 45 is associated with a screw member 47 which is pivotally rotatably supported in the top plate 20 and bottom plate 21, the screw member being provided with a head 48 at its lowermost end by means of which the screw member may be rotated, a nut 49 at the opposite end being operable to lock the screw member in a desired position of its rotation. The screw member carries a nut 50, this nut having a threaded stud 51 which projects through and is laterally adjustably movable longitudinally of an elongate slot 52 formed in the back plate 19. The stud 51 may be locked and secured in its adjusted position within the slot 52 by means of a pair of associated nuts 53 and 54.

Auxiliary stops are provided to permit an initial downward swinging movement of the pantograph structure in a direction to move the arm 23 out of contact with the associated stop 44 or 45 prior to raising the gauge wheel 43 out of ground contact when the rollover frame is raised to a tilted position for transport of the plow from one location to another or for rollover operation. As shown in FIG. 3, the bell crank arm forming plates 27 and 28 is provided with forwardly projecting stop pin members 55 and 56 which are positioned adjacent the bell crank pivot on the stub axle 22 and respectively being positioned on opposite sides of the associated end of the arm 26.

Having thus described the construction generally of the foregoing embodiment of the invention, the operation will now be considered by reference to FIGS. 4, 5 and 6. As shown in FIG. 4, the rollover frame is positioned for plowing left. The plowing depth is determined by the engagement of the arm 23 in this case with the adjustable stop 45. To increase the plowing depth, the stop 45 would be raised, thus permitting further counterclockwise rotation of the arm 23. By the same token, if it is desired to obtain more shallow plowing, the stop 45 is lowered. In the adjusted plowing depth positions, the arm 23 is inclined outwardly and downwardly below a horizontal plane passing through the axis of rotation of the arm 23. It is thus possible to utilize gauge wheels of smaller diameter than would otherwise be required. Also, it will be noted that as the plowing depth increases, the arm 23 increasingly moves the gauge wheel further outwardly away from the furrow. In this manner, greater ground support is obtained as the lateral support in the furrow is decreased by increasing plowing depth. Thus a tendency to cause disruption of the furrow wall is reduced to a minimum.

Assuming that it is now desired to shift from a plowing left position as shown in FIG. 4 to a plowing right position as shown in FIG. 6, the beam 10 will be tilted by the draft mechanism so as to raise the plows from the furrow position as shown in FIG. 4. During the initial raising movement, it will be apparent that the gauge wheel 43 will remain in contact with the ground and that as the arm 23 starts to rotate clockwise, it will reach a position as shown in phantom lines where its rotational movement will be terminated by the auxiliary stop pin 55. This initial freedom of movement of the gauge wheel pantograph support thus eliminates initial beginning impacts on the gauge wheel and permits more positive control after the raising movements of the plowing mechanism have been initiated. After the plow frames have been sufficiently raised to permit the gauge wheel to clear the ground during rollover, the rollover operation may be initiated.

As the rollover frame approaches mid-position, as shown in FIG. 5, it will be observed that the plane of rotation of the gauge wheel 43 is horizontal and thus provides minimum turning radius for ground clearance as compared to arrangements in which the gauge wheel remains with its plane of rotation vertically disposed. Further, it will be observed that in the mid-position the justed plowing depth position. In this position, it will be observed that the edge 78 of the abutment member 77 is in engagement with the lowermost stop member 76 and acts to limit further downward movement of the plow supporting framework.

Assuming now that it is desired to shift the plows to a left-hand plowing position, the beam 10 will be tilted in the manner previously explained so as to raise the plows preparatory to a rollover operation. During the raising movement, the gauge wheel 43' will remain in contact with the ground and the pantograph linkage will operate to move the edge 78 downwardly away from the stop 76 as the arm 23' rotates in a counterclockwise direction. This rotation of the arm 23' will be terminated upon engagement of the upper end portion of the arm with the auxiliary stop 56'. As the raising tilting movement continues, the gauge wheel will be lifted from the ground.

As the rollover operation begins, the rotation of the rollover frame will be counterclockwise. At approximately 30° additional rollover movement, the force of gravity acting upon the counterweight 94 and other off-center parts associated with the bracket 66 will act to pivot the bracket about the pin 70, whereupon the stops 75 and 76 will be moved out of the plane of the path of travel of the abutment member 77 as shown in FIG. 13, thus permitting the gauge wheel to assume a middle rollover position as shown in FIG. 11. In this position, the abutment member 77 will be disposed midway between the stops 75 and 76.

Continued rollover movement will then bring the upper end of the arm 23' into engagement with the auxiliary stop 55', at which time the abutment member 77 will have passed beyond the main stop 75. Upon reaching full rollover position, decreased action of the gravitational force will be such that the tension spring 86 will now act through the cam roller 90 and cam plate 91 to axially move the arm 87 and push the angle bracket 66 to its normal seated position wherein the stops 75 and 76 will once again be in the path of travel of the abutment member 77.

Now as the beam 10 is lowered in order to permit entry of the plows into the ground, the gauge wheel 43' upon engagement with the adjacent ground surface will move the edge 79 of the abutment member into engagement with the stop 75 which is adjusted for the desired plowing depth. In reversing the transition from one plowing position to the other, the actuation of the parts will be in reversed order to that described above.

Various modifications may suggest themselves to those skilled in the art without departing from the spirit of my invention, and, hence, I do not wish to be restricted to the specific form shown or uses mentioned except to the extent indicated in the appended claims, wherein various portions have been separated for clarity of reading and not for emphasis.

I claim:
1. In a two-way plow:
(a) a support frame;
(b) a rollover frame carried by said support frame and adapted for swinging movement about an axis of rotation from an operative position on one side to an operative position on the other side thereof to selectively present associated plow members for use;
(c) a supporting structure including an arm pivotally connected at one end to one of said frames for swinging movement about said axis of rotation in a plane in right angled relation to said axis;
(d) a depth gauge wheel rotatably mounted at the other end of said arm for movement from an operating position on one side of the support frame to an operating position on the other side of the support frame in accordance with changes in the operative position of the rollover frame; and
(e) bracket means operatively associated with said structure including a pair of adjustably spaced apart stops, each of said stops being operable with respect to said arm in one of the operative positions of said rollover frame to limit its downward movement during a plowing operation.

2. In a two-way plow:
(a) a support frame;
(b) a rollover frame carried by said support frame and adapted for swinging movement from an operative position on one side to an operative position on the other side theerof to selectively present associated plow members for use;
(c) a supporting structure including a main load carrying arm pivotally connected at one end for swinging movement in a plane in right angled relation to and about the axis of rotation of said rollover frame;
(d) a depth gauge wheel rotatably mounted at the other end of said arm for movement from an operating position on one side of the support frame to an operating position on the other side of the support frame in accordance with changes in the operative positive position of the rollover frame;
(e) means adjacent said one end for limiting swinging movement of the arm in opposite directions on its pivotal connection; and
(f) bracket means operatively associated with said arm including a pair of adjustably spaced apart stops, each of said stops being operable in one of the operative positions of said rollover frame to limit its downward movement during a plowing operation.

3. In a two-way plow:
(a) a support frame;
(b) a rollover frame carried by said support frame and adapted for swinging movement from an operative position on one side to an operative position on the other side thereof to selectively present associated plow members for use;
(c) an arm pivotally connected at one end to one of same frames for swinging movement in a plane in right angled relation to the axis of rotation of said rollover frame;
(d) an axle extending from the other end of said arm and pivoted for swinging movement;
(e) a depth gauge wheel rotatably mounted on said axle for unitary movement with said arm from an operating position on one side of the support frame to an operating position on the other side of the support frame in accordance with changes in the operative position of the rollover frame;
(f) means forming with said arm a parallel linkage for varying the pivotal position of said axle according to the selected operating position of said rollover frame; and
(g) bracket means operatively associated with said arm including a pair of adjustably spaced apart stops, each of said stops being operable on one of the operative positions of said rollover frame to limit its downward movement during a plowing operation.

4. In a two-way plow, the combination of:
(a) a mobile frame including a rearwardly extending longitudinal beam;
(b) a carrier for ground engaging plow means mounted to turn on said beam to selective operative positions for producing either a right-hand furrow or a left-hand furrow;
(c) a main load carrying arm pivoted for swinging movement about an axis parallel to the turning axis of said carrier;
(d) a wheel carried by said arm and adapted to roll upon unploughed ground in either operative position of said carrier;
(e) a stationary bracket fixed relative to the longitudinal beam in proximity of the path of swing of said arm;

auxiliary stop pins 55 and 56 are out of engagement with the arm 23, since the position of these pins will follow the movement of the rollover frame. The arm 23 is thus released for limited lateral freedom of movement at the mid-position in the event that the wheel should strike some object during transport of the plow from one location to another, wherby its possible damage may be obviated.

As the rollover operation continues, by clockwise rotation of the rollover frame, as viewed in FIGS. 4, 5 and 6, the pantograph and supported gauge wheel will assume a position under the effect of gravitational force wherein the arm 23 will be in engagement with auxiliary stop pin 56 as clearly shown in FIG. 6 in phantom lines.

When it is desired to continue the plowing operation in the new plowing position, the beam 10 is lowered so as to engage the working plow bottoms with the ground surface. As the lowering of the beam 10 continues, the working plow bottoms will begin penetration and the arm 23 will move away from the auxiliary stop pin 56 until it engages with the stop 44 which determines the plowing depth. To reverse the plowing operation, the rollover frame is moved in the opposite or clockwise direction and a similar operation is obtained with respect to the pantograph and control of the movement of the gauge wheel during this transition.

The position shown in FIG. 5, as previously noted constitutes the transport position of the plow, and in this position the gauge wheel may be secured and safely latched against swinging movement by providing an auxiliary elongate latch bar or link 57, as shown in dashed lines. The length of this bar is such that when it is connected between inner and outer ends respectively of the turnbuckle link 30 and the arm 23, the pantograph linkage will be retained against pivotal movement of its parts. This safety latch or bar would be removed during the plowing operations.

Referring now to the embodiment shown in FIG. 7, the arrangement therein operates on the same basic principles as the arrangement previously described, and for purposes of description corresponding elements have been indicated by similar numerals, except that the numerals have been primed.

The embodiment shown in FIG. 7 differs primarily from that disclosed in FIG. 1 in that the former has been modified for mounting on and for movement with the rollover frame. In this arrangement, it is not possible to utilize a fixed support for the plowing depth determining stop members 44 and 45 as in the disclosure of FIG. 1. As shown in FIG. 7, it will be seen that the relative positions of the turnbuckle link 30' and the arm 23' have been reversed so that the latter is rearwardly disposed with reference to the former. The plates 27' and 28' are in this instance embodied into a channel member 58 which is connected on the side of the plate 27' with a box-like structure 59 to form a frame assembly which is connected as by bolts 60 and 61 to the part 16 of the rollover frame structure for movement therewith.

The box-like structure 59 is fabricated with a back wall 62 from which there extends side walls 63 and 64, and a forward end wall 65. The structure is thus open on the side facing away from the back wall 62, and on this side there is pivotally supported an angular bracket, as generally indicated by the numeral 66, this bracket having right angle leg portions 67 and 68. As shown in FIG. 8, the leg portion 67 is outwardly tapered and at its outer extremity is provided with spaced hinge lugs 69—69 by which the bracket is pivotally supported on a hinge pin 70 having its ends respectively supported in the side walls 63 and 64. As shown in FIG. 7, the pin 70 is provided with a square head 71 that abuts against a projecting stop 72 which retains the pin against rotation.

As shown in FIG. 9, the leg portion 68 of angular bracket 66 is provided with an arcuate outer edge 73 along the margin of which a plurality of holes 74 are provided for the reception of stop members 75 and 76. These stop members are utilized in a similar manner to the previously described stops 44 and 45 and are utilized for regulating the plowing depth. It will be noted that in the normal operative position of the angular bracket 66, the stop members 75 and 76 project outwardly of the rear surface of the leg portion 68 and are positioned in the path of travel of an abutment member or arm 77 carried by and associated with the bell crank 38', this arm having a pointed outer end defined by converging end edges 78 and 79 which are adapted to respectively engage the stops 76 and 75 depending upon the plow operating position which is being utilized.

Since the lowermost stop is engaged in each plowing position, it will be necessary in shifting from one plowing position to the other, for the abutment member or arm 77 to move past the stops 75 and 76. Provision is made for taking advantage of gravitational force to pivot the angular bracket 66 about its pivotal support in such manner as to move the stops 75 and 76 out of the path of travel of the abutment member 77 during the transition from one plowing position to the other. In order to provide for this operation, the leg portion 67 of the angular bracket is provided with a substantially rectangular opening 80 in which there is mounted a U-shaped member 81, as best shown in FIGS. 8 and 14. The member is mounted with its bridging portion uppermost as shown in FIG. 14, and with spaced leg portions 82 and 83 welded or otherwise secured intermediate their length to the leg portion 67 so as to be disposed in substantially right angle relation thereto. The outermost ends of the leg portions are held in spaced relation by means of a tubular spacer 84 through which there extends a retaining bolt 85. A tension spring 86 is anchored at one end between the leg portions and adjacent to the bridging portion of the U-shaped member, while the other end of the spring is secured intermediate the ends of an elongate arm 87 which is supported for pivotal movement on a pivot pin 88 at one end at the juncture of the leg portions 67 and 68 of the angular bracket. The other end of the arm 87 is provided with an opening 89 in which there is mounted a rotatable roller 90. The roller 90 is adapted to ride over and engage an adjacent surface of an inclined cam plate 91 which is formed as a part of an angle member secured to the forward end wall 65 as by securing bolts 93. The angular bracket 66 carries a counterweight 94 which normally serves as a stop in the normal position of the angle bracket, but during transition from one plowing position to the other will act under the force of gravity to pivot the angle bracket against the force of spring 86 and move the stop members 75 and 76 out of the path of travel of the abutment member 77 as previously explained. However, as the rollover frame approaches a plowing position, the tension spring force will override the decreasing force of gravity and through the action of this spring on the arm 87, and the camming action of the roller 90 on the cam plate 91 will positively move the angle bracket 66 to its seated or normal position, in which position the abutment member 77 can move upwardly into engagement with the lowermost stop member and provide the proper adjusted plowing depth. The camming action of the edges 78 and 79 respectively on their associated stop member will be such as to aid in retaining the angle bracket in its normal seated position.

Mounted on the rear face of the plate 28' of the channel member 58 are angle lugs 55' and 56' which provide auxiliary stops which operate in a similar manner to the previously explained stop pins 55–56.

Figure 10:
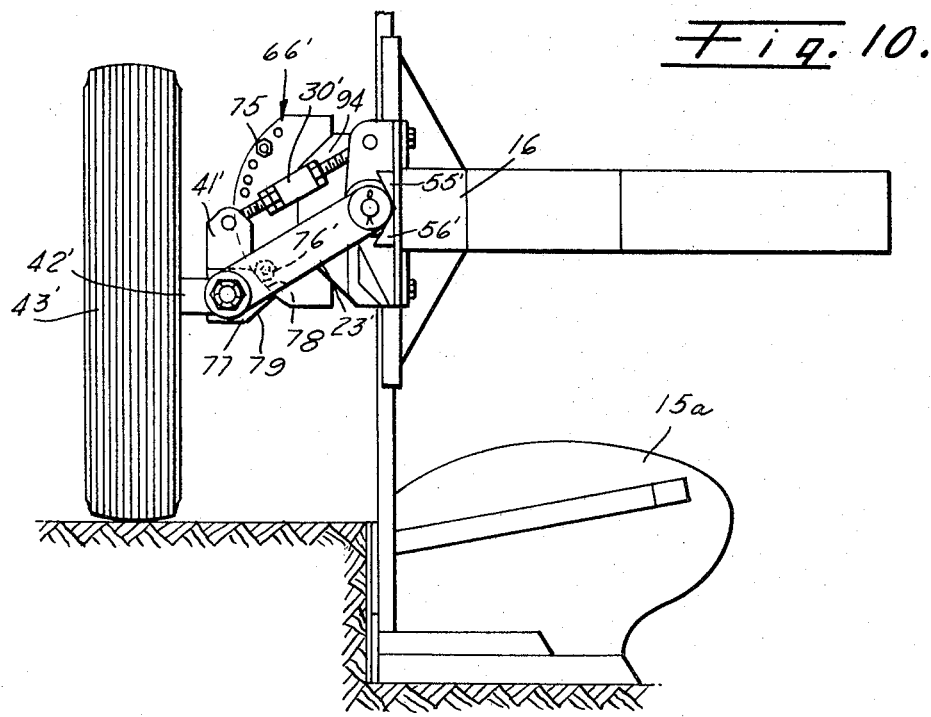
Figure 12:
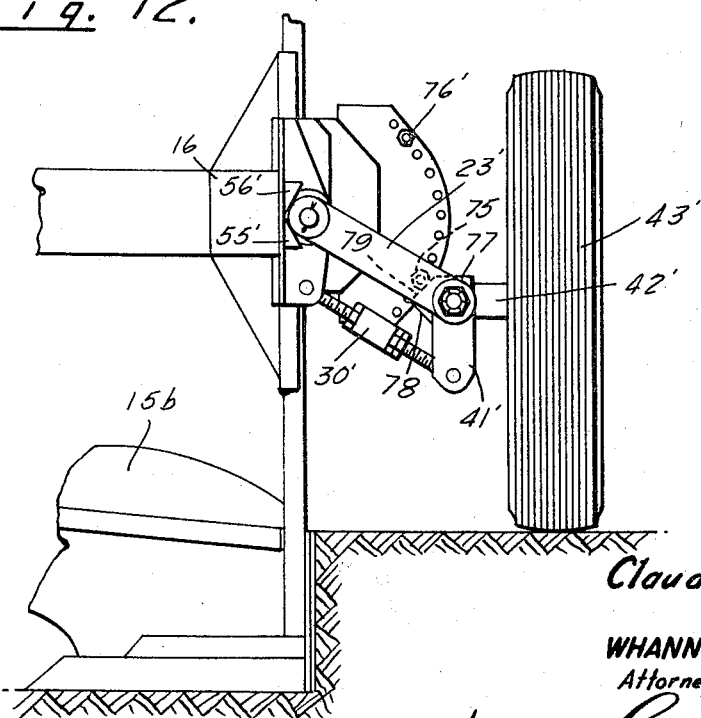

Referring now to FIGS. 10, 11 and 12, the operation of this embodiment of the invention will be further explained. FIG. 10 illustrates the position of the depth gauging mechanism when the rollover frame is set for right-hand plowing, the plow boards being in the ad- (f) a pair of laterally spaced adjustable stop elements on said bracket, each of said elements engaging said wheel arm in one of the operative positions of the carrier to limit downward movement of the carrier; and (g) means controlled by said carrier, including a lost motion connection between the carrier and said arm, for varying the wheel position when changing the operative positions of said carrier.

5. In a two-way plow, the combination of:
(a) a mobile frame including a rearwardly extending longitudinal beam;
(b) a carrier for ground engaging plow means mounted to turn on said beam to selective operative positions for producing either a right-hand furrow or a left-hand furrow;
(c) a parallel linkage structure including an arm pivoted for swinging movement about a portion of said beam;
(d) a wheel carried by said structure adapted to roll upon unploughed ground in either operative position of said carrier;
(e) a first bracket fixed relative to the longitudinal beam in proximity to said structure;
(f) means including a second bracket movable with said carrier;
(g) a pair of laterally spaced adjustable stop elements on said first bracket, each of said elements being engageable with a part of said structure in one of the operative positions of the carrier to limit downward movement of the carrier; and
(h) means carried by said second bracket forming a lost motion driving connection with said arm limiting its swinging movement to an angle less than that of the full swing movement of the parallel linkage.

6. In a two-way plow, the combination of:
(a) a mobile frame including a rearwardly extending longitudinal beam;
(b) a carrier for ground engaging plow means mounted to turn on said beam to selective operative positions for producing either a right-hand furrow or a left-hand furrow;
(c) a parallel linkage including a pair of elongate side arms pivotally connected at their inner ends to an inner end link and at their outer ends to an outer end link, the pivot between the inner end link and the adjacent end of one of said side arms being fixed and coincident with the turning axis of said carrier, the other of said side arms being adjustable as to length;
(d) an axle projecting from said outer end link at a right angle;
(e) a wheel carried by said axle adapted to roll upon unploughed ground in either operative position of said carrier;
(f) a stationary bracket fixed relative to the longitudinal beam in proximity to the path of swing of said one of said side arms;
(g) a pair of laterally spaced adjustable stop elements on said bracket, each of said elements engaging said one of said side arms in one of the operative positions of the carrier to limit downward movement of the carrier; and
(h) a lost motion driving connection between said carrier and the said one of said side arms, including spaced stop members adjacent the pivoted end of said one of said side arms.

7. In a two-way plow having a plow carrying frame supported for selective movement from side-to-side operative positions about an axis of rotation extending longitudinally above the surface of the ground, a ground contacting wheel structure comprising:
(a) support means;
(b) a wheel rotatably carried by said support means;
(c) pivot means connecting said support means at one side of said frame so as to pivot about an axis in parallel relation to the axis of rotation of said frame;
(d) adjustable vertically spaced stops carried by said one side of said frame so arranged that in each operative position of the frame the then lowermost stop engages a part of said support means to limit its upward swinging about its pivotally axis to a path generally below the axis of rotation of said frame; and
(e) means carried by said frame for offsetting the planes of relative movement of said support means and said stops during rotation of said frame from one operative plowing position to the other.

8. In a two-way plow having a plow carrying frame supported for selective movement from side-to-side operative positions about an axis of rotation extending longitudinally above the surface of the ground, a ground contacting wheel structure comprising:
(a) support means;
(b) a wheel rotatably carried by said support means;
(c) pivot means mounting said support means at one side of said frame so as to pivot about an axis in parallel relation to the axis of rotation of said frame;
(d) a bracket pivoted on said one side of said frame for swinging movements;
(e) adjustable vertically spaced stops carried by said bracket;
(f) means normally acting in each operative position of the frame to urge the bracket to a position in which the then lowermost stop is in the path of movement of and engages a part of said support means to limit its upward swinging about its pivotal axis to a path generally below the axis of rotation of said frame; and
(g) means operative to urge the bracket to a position for offsetting the planes of relative movement of said support means and said stops during rotation of said frame from one operative plowing position of the other.

9. In a two-way plow, the combination according to claim 8, wherein the means operative to urge said bracket includes a member acted upon by gravitational force.

References Cited by the Examiner

UNITED STATES PATENTS

| | | | |
|---|---|---|---|
| 2,842,038 | 7/1958 | Chandler | 172—212 |
| 2,921,639 | 1/1960 | Welch | 172—224 X |
| 2,923,362 | 2/1960 | Toland et al. | 172—224 X |
| 2,927,651 | 3/1960 | Murray et al. | 172—212 |
| 3,128,832 | 4/1964 | Habare | 172—224 |

ABRAHAM G. STONE, *Primary Examiner.*

R. L. HOLLISTER, *Assistant Examiner.*